United States Patent
Makeev et al.

(10) Patent No.: US 11,265,553 B2
(45) Date of Patent: Mar. 1, 2022

(54) OBTAINING A TARGET REPRESENTATION OF A TIME SAMPLE OF A SIGNAL

(71) Applicant: V-NOVA INTERNATIONAL LIMITED, London (GB)

(72) Inventors: Ivan Makeev, London (GB); Balázs Keszthelyi, London (GB); Robert Ettinger, London (GB); Michele Sanna, London (GB); Stergios Poularakis, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 16/648,107

(22) PCT Filed: Sep. 21, 2018

(86) PCT No.: PCT/EP2018/075603
§ 371 (c)(1),
(2) Date: Mar. 17, 2020

(87) PCT Pub. No.: WO2019/057893
PCT Pub. Date: Mar. 28, 2019

(65) Prior Publication Data
US 2020/0280723 A1    Sep. 3, 2020

(30) Foreign Application Priority Data
Sep. 22, 2017   (GR) .............................. 20170100431

(51) Int. Cl.
*H04N 11/02* (2006.01)
*H04N 19/15* (2014.01)
(Continued)

(52) U.S. Cl.
CPC ........... *H04N 19/15* (2014.11); *H04N 19/107* (2014.11); *H04N 19/176* (2014.11); *H04N 19/33* (2014.11); *H04N 19/59* (2014.11)

(58) Field of Classification Search
CPC .... H04N 19/15; H04N 19/107; H04N 19/176; H04N 19/33; H04N 19/59
(Continued)

(56) References Cited

U.S. PATENT DOCUMENTS

| 2007/0064797 A1 | 3/2007 | Miao et al. |
| 2007/0206874 A1* | 9/2007 | Lee .................. H04N 19/12 382/239 |

(Continued)

FOREIGN PATENT DOCUMENTS

| EP | 1151613 | 12/2012 |
| GB | 1603727 | 11/1981 |

OTHER PUBLICATIONS

International Search Report and Written Opinion of PCT/EP2018/075603 dated Jan. 9, 2019.
(Continued)

*Primary Examiner* — Jayanti K Patel
*Assistant Examiner* — Richard B Carter
(74) *Attorney, Agent, or Firm* — Workman Nydegger

(57) ABSTRACT

A first value of a first data element (311) in a first set of data elements (310) is obtained, the first set of data elements being based on a first time sample of a signal. A second value of a second data element (321) in a second set of data elements (320) is obtained, the second set of data elements being based on a second, later time sample of the signal. A measure of similarity is derived between the first value and the second value. Based on the derived measure, a quantisation parameter useable in performing quantisation on data
(Continued)

based on the first time sample of the signal is determined. Output data is generated using the quantisation parameter.

20 Claims, 6 Drawing Sheets

(51) Int. Cl.
*H04N 19/107* (2014.01)
*H04N 19/176* (2014.01)
*H04N 19/33* (2014.01)
*H04N 19/59* (2014.01)

(58) Field of Classification Search
USPC .......... 375/240.03, 240.12; 348/43; 382/233, 382/239
See application file for complete search history.

(56) References Cited

U.S. PATENT DOCUMENTS

| 2007/0223582 | A1* | 9/2007 | Borer | H04N 19/122 |
| | | | | 375/240.12 |
| 2011/0103701 | A1* | 5/2011 | Cheon | H04N 19/395 |
| | | | | 382/233 |
| 2014/0085415 | A1* | 3/2014 | Bici | H04N 19/597 |
| | | | | 348/43 |
| 2016/0373688 | A1* | 12/2016 | Imajo | H04N 19/157 |
| 2019/0312585 | A1* | 10/2019 | Handford | H04N 19/30 |

OTHER PUBLICATIONS

Wiegand et al., "Rate-Distortion Optimized Mode Selection for Very Low Bit Rate Video Coding and the Emerging H.263 Standard", IEEE Transactions on Circuits and Systems for Video Technology, Institute of Electrical and Electronics Engineers, US, vol. 6, No. 2, Apr. 1, 1996 (Apr. 1, 1996), XP011014299, ISSN: 1051-8215 [the whole document].

* cited by examiner

OBTAINING A TARGET REPRESENTATION OF A TIME SAMPLE OF A SIGNAL

This application is a 371 US Nationalization of International Application No. PCT/EP2018/075603, filed Sep. 21, 2018, which claims priority to Greek Application No. 20170100431, filed Sep. 22, 2017, the disclosures of which are hereby enclosed herein in their entireties.

TECHNICAL FIELD

This invention relates to apparatuses, methods, computer programs and computer-readable media. In particular, but not exclusively, this invention relates to apparatuses, methods, computer programs and computer-readable media for use in the obtaining of a target representation of a first time sample of a signal.

BACKGROUND

Compression and decompression of signals is a consideration in many known systems. Many types of signal, for example video, audio or volumetric signals, may be compressed and encoded for transmission, for example over a data communications network. When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at one or more different levels of quality, for example depending on the capabilities of the decoder and the available bandwidth. The amount of information used to perform such a reconstruction may vary, for example depending on the desired level of quality of the reconstructed signal and/or the nature of the data that is used in the reconstruction. Relatively large amounts of information may therefore be stored and/or transmitted, particularly as the usage of higher quality, higher definition video becomes more widespread.

SUMMARY

According to a first aspect of the present invention, there is provided a method for use in the obtaining of a target representation of a first time sample of a signal, the signal being arranged in accordance with a tiered hierarchy having multiple levels of quality, the method comprising:

comparing a first entropy associated with first reconstruction data useable by a decoder device to obtain the target representation using a first processing mode with a second entropy associated with second reconstruction data useable by the decoder device to obtain the target representation using a second, different processing mode, the target representation being at a first level of quality in the tiered hierarchy;

determining whether the target representation is to be obtained by the decoder device using the first processing mode or the second processing mode based on a result of the comparison, wherein the first processing mode is to be used when the result of the comparison indicates that the first entropy is lower than the second entropy and the second processing mode is to be used when the result of the comparison indicates that the second entropy is lower than the first entropy; and outputting data arranged to indicate whether the first processing mode or the second processing mode is to be used by the decoder device to obtain the target representation, wherein using the first processing mode to obtain the target representation comprises the first reconstruction data and a further representation of the first time sample of the signal that is at a second, lower level of quality in the tiered hierarchy being processed by the decoder device, and wherein using the second processing mode to obtain the target representation comprises the second reconstruction data and a representation of a second, different time sample of the signal being processed by the decoder device.

According to a second aspect of the present invention, there is provided an apparatus configured to perform a method for use in the obtaining of a target representation of a first time sample of a signal, the signal being arranged in accordance with a tiered hierarchy having multiple levels of quality, the method comprising:

comparing a first entropy associated with first reconstruction data useable by a decoder device to obtain the target representation using a first processing mode with a second entropy associated with second reconstruction data useable by the decoder device to obtain the target representation using a second, different processing mode, the target representation being at a first level of quality in the tiered hierarchy;

determining whether the target representation is to be obtained by the decoder device using the first processing mode or the second processing mode based on a result of the comparison, wherein the first processing mode is to be used when the result of the comparison indicates that the first entropy is lower than the second entropy and the second processing mode is to be used when the result of the comparison indicates that the second entropy is lower than the first entropy; and outputting data arranged to indicate whether the first processing mode or the second processing mode is to be used by the decoder device to obtain the target representation, wherein using the first processing mode to obtain the target representation comprises the first reconstruction data and a further representation of the first time sample of the signal that is at a second, lower level of quality in the tiered hierarchy being processed by the decoder device, and wherein using the second processing mode to obtain the target representation comprises the second reconstruction data and a representation of a second, different time sample of the signal being processed by the decoder device.

According to a third aspect of the present invention, there is provided a computer program comprising instructions which, when executed, cause an apparatus to perform a method for use in the obtaining of a target representation of a first time sample of a signal, the signal being arranged in accordance with a tiered hierarchy having multiple levels of quality, the method comprising:

comparing a first entropy associated with first reconstruction data useable by a decoder device to obtain the target representation using a first processing mode with a second entropy associated with second reconstruction data useable by the decoder device to obtain the target representation using a second, different processing mode, the target representation being at a first level of quality in the tiered hierarchy;

determining whether the target representation is to be obtained by the decoder device using the first processing mode or the second processing mode based on a result of the comparison, wherein the first processing mode is to be used when the result of the comparison indicates that the first entropy is lower than the second entropy and the second processing mode is to be used when the result of the comparison indicates that the second entropy is lower than the first entropy; and outputting data arranged to indicate whether the first processing mode or the second processing mode is to be used by the decoder device to obtain the target representation, wherein using the first processing mode to obtain the target representation comprises the first reconstruction data and a further representation of the first time sample of the signal that is at a second, lower level of quality in the tiered hierarchy being processed by the decoder device, and wherein using the second processing mode to obtain the target representation comprises the second reconstruction data and a representation of a second, different time sample of the signal being processed by the decoder device.

According to a fourth aspect of the present invention, there is provided a computer-readable medium comprising a computer program comprising instructions which, when executed, cause an apparatus to perform a method for use in the obtaining of a target representation of a first time sample of a signal, the signal being arranged in accordance with a tiered hierarchy having multiple levels of quality, the method comprising:

comparing a first entropy associated with first reconstruction data useable by a decoder device to obtain the target representation using a first processing mode with a second entropy associated with second reconstruction data useable by the decoder device to obtain the target representation using a second, different processing mode, the target representation being at a first level of quality in the tiered hierarchy;

determining whether the target representation is to be obtained by the decoder device using the first processing mode or the second processing mode based on a result of the comparison, wherein the first processing mode is to be used when the result of the comparison indicates that the first entropy is lower than the second entropy and the second processing mode is to be used when the result of the comparison indicates that the second entropy is lower than the first entropy; and outputting data arranged to indicate whether the first processing mode or the second processing mode is to be used by the decoder device to obtain the target representation, wherein using the first processing mode to obtain the target representation comprises the first reconstruction data and a further representation of the first time sample of the signal that is at a second, lower level of quality in the tiered hierarchy being processed by the decoder device, and wherein using the second processing mode to obtain the target representation comprises the second reconstruction data and a representation of a second, different time sample of the signal being processed by the decoder device.

According to a fifth aspect of the present invention, there is provided a method of obtaining a target representation of a first time sample of a signal, the signal being arranged in accordance with a tiered hierarchy having multiple levels of quality, the method comprising:

determining, based on received data, whether the target representation is to be obtained using a first processing mode or a second, different processing mode, the target representation being at a first level of quality in the tiered hierarchy; and obtaining, by a decoder device, the target representation using either the first processing mode or the second processing mode based on a result of the determination, wherein using the first processing mode to obtain the target representation comprises the decoder device processing first reconstruction data and a further representation of the first time sample of the signal that is at a second, lower level of quality in the tiered hierarchy, wherein using the second processing mode to obtain the target representation comprises the decoder device processing second reconstruction data and a representation of a second, different time sample of the signal, and wherein the first processing mode is to be used by the decoder device when a first entropy associated with the first reconstruction data is lower than a second entropy associated with the second reconstruction data, and the second processing mode is to be used by the decoder device when the second entropy is lower than the first entropy.

According to a sixth aspect of the present invention, there is provided an apparatus configured to perform a method of obtaining a target representation of a first time sample of a signal, the signal being arranged in accordance with a tiered hierarchy having multiple levels of quality, the method comprising:

determining, based on received data, whether the target representation is to be obtained using a first processing mode or a second, different processing mode, the target representation being at a first level of quality in the tiered hierarchy; and obtaining, by a decoder device, the target representation using either the first processing mode or the second processing mode based on a result of the determination, wherein using the first processing mode to obtain the target representation comprises the decoder device processing first reconstruction data and a further representation of the first time sample of the signal that is at a second, lower level of quality in the tiered hierarchy, wherein using the second processing mode to obtain the target representation comprises the decoder device processing second reconstruction data and a representation of a second, different time sample of the signal, and wherein the first processing mode is to be used by the decoder device when a first entropy associated with the first reconstruction data is lower than a second entropy associated with the second reconstruction data, and the second processing mode is to be used by the decoder device when the second entropy is lower than the first entropy.

According to a seventh aspect of the present invention, there is provided a computer program comprising instructions which, when executed, cause an apparatus to perform a method of obtaining a target representation of a first time sample of a signal, the signal being arranged in accordance with a tiered hierarchy having multiple levels of quality, the method comprising:

determining, based on received data, whether the target representation is to be obtained using a first processing mode or a second, different processing mode, the target representation being at a first level of quality in the tiered hierarchy; and obtaining, by a decoder device, the target representation using either the first processing mode or the second processing mode based on a result of the determination, wherein using the first processing mode to obtain the target representation comprises the decoder device processing first reconstruction data and a further representation of the first time sample of the signal that is at a second, lower level of quality in the tiered hierarchy, wherein using the second processing mode to obtain the target representation comprises the decoder device processing second reconstruction data and a representation of a second, different time sample of the signal, and wherein the first processing mode is to be used by the decoder device when a first entropy associated with the first reconstruction data is lower than a second entropy associated with the second reconstruction data, and the second processing mode is to be used by the decoder device when the second entropy is lower than the first entropy.

According to an eighth aspect of the present invention, there is provided a computer-readable medium comprising a computer program comprising instructions which, when executed, cause an apparatus to perform a method of obtaining a target representation of a first time sample of a signal, the signal being arranged in accordance with a tiered hierarchy having multiple levels of quality, the method comprising:

determining, based on received data, whether the target representation is to be obtained using a first processing mode or a second, different processing mode, the target representation being at a first level of quality in the tiered hierarchy; and obtaining, by a decoder device, the target representation using either the first processing mode or the second processing mode based on a result of the determination, wherein using the first processing mode to obtain the target representation comprises the decoder device processing first reconstruction data and a further representation of the first time sample of the signal that is at a second, lower level of quality in the tiered hierarchy, wherein using the second processing mode to obtain the target representation comprises the decoder device processing second reconstruction data and a representation of a second, different time sample of the signal, and wherein the first processing mode is to be used by the decoder device when a first entropy associated with the first reconstruction data is lower than a second entropy associated with the second reconstruction data, and the second processing mode is to be used by the decoder device when the second entropy is lower than the first entropy.

According to a ninth aspect of the present invention, there is provided an encoder device configured to:
identify the lower of:
  a first entropy of intra-processing data useable by a decoder device to obtain a target representation of a signal based on a first representation of the signal, the first representation and the target representation being part of a same time sample of the signal; and
  a second entropy of inter-processing data useable by the decoder device to obtain the target representation of the signal based on a second, different representation of the signal, the second representation being part of an earlier time sample of the signal; and
output, for transmission to the decoder device:
data arranged to indicate that the decoder device is to use the intra-processing data to obtain the target representation of the signal in response to the first entropy being identified as the lower of the first and second entropies; or
data arranged to indicate that the decoder device is to use the inter-processing data to obtain the target representation of the signal in response to the second entropy being identified as the lower of the first and second entropies.

According to a tenth aspect of the present invention, there is provided a decoder device configured to:
receive data arranged to indicate whether the decoder device is to use intra-processing data or inter-processing data to obtain a target representation of a signal;
determine, based on the received data, whether the decoder device is to use the intra-processing data or the inter-processing data to obtain the target representation of the signal; and
obtain the target representation of the signal:
  based on a first representation of the signal and using the intra-processing data in response to the determining indicating that the decoder device is to use the intra-processing data to obtain the target representation of the signal, the first representation and the target representation being part of a same time sample of the signal; or
  based on a second, different representation of the signal and using the inter-processing data in response to the determining indicating that the decoder device is to use the inter-processing data to obtain the target representation of the signal, the second representation being part of an earlier time sample of the signal.

Further features and advantages will become apparent from the following description of preferred embodiments, given by way of example only, which is made with reference to the accompanying drawings.

DETAILED DESCRIPTION

Figure 1:
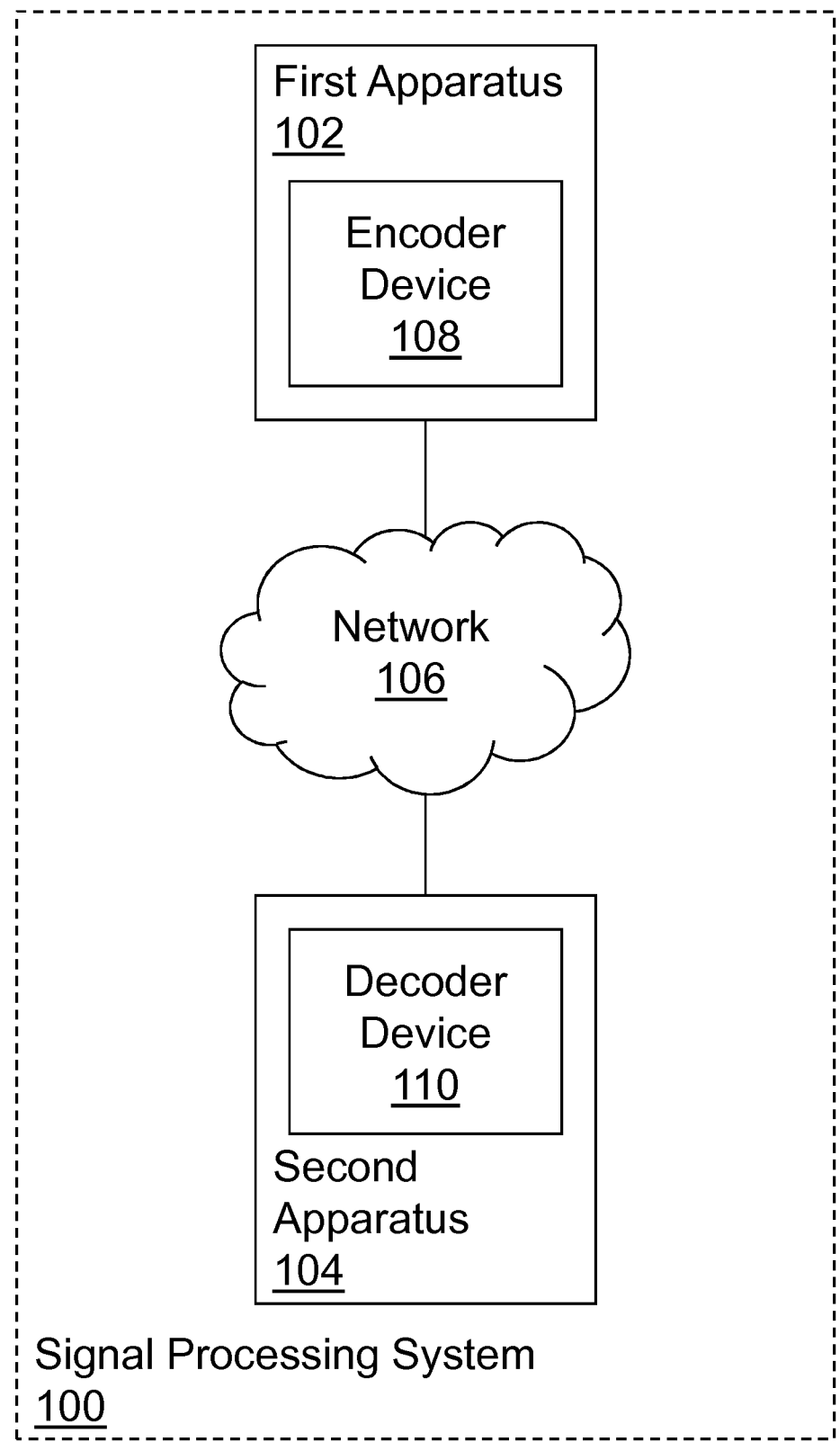
FIG. 1 shows a schematic block diagram of an example of a signal processing system in accordance with an embodiment of the present invention.

Referring to FIG. 1, there is shown an example of a signal processing system 100. The signal processing system 100 is used to process signals. Examples of types of signal include, but are not limited to, video signals, image signals, audio signals, volumetric signals such as those used in medical, scientific or holographic imaging, or other multidimensional signals.

The signal processing system 100 includes a first apparatus 102 and a second apparatus 104. The first apparatus 102 and second apparatus 104 may have a client-server relationship, with the first apparatus 102 performing the functions of a server device and the second apparatus 104 performing the functions of a client device. The signal processing system 100 may include at least one additional apparatus (not shown). The first apparatus 102 and/or second apparatus 104 may comprise one or more components. The one or more components may be implemented in hardware and/or software. The one or more components may be co-located or may be located remotely from each other in the signal processing system 100. Examples of types of apparatus include, but are not limited to, computerised devices, handheld or laptop computers, tablets, mobile devices, games consoles, smart televisions, set-top boxes, augmented and/or virtual reality headsets etc.

The first apparatus 102 is communicatively coupled to the second apparatus 104 via a data communications network 106. Examples of the data communications network 106 include, but are not limited to, the Internet, a Local Area Network (LAN) and a Wide Area Network (WAN). The first and/or second apparatus 102, 104 may have a wired and/or wireless connection to the data communications network 106.

The first apparatus 102 comprises an encoder device 108. The encoder device 108 is configured to encode data comprised in the signal, which is referred to hereinafter as "signal data". The encoder device 108 may perform one or more further functions in addition to encoding signal data. The encoder device 108 may be embodied in various different ways. For example, the encoder device 108 may be embodied in hardware and/or software.

Although in this example the first apparatus 102 comprises the encoder device 108, in other examples the first apparatus 102 is separate from the encoder device 108. In such examples, the first apparatus 102 is communicatively coupled to the encoder device 108. The first apparatus 102 may be embodied as one or more software functions and/or hardware modules.

The second apparatus 104 comprises a decoder device 110. The decoder device 110 is configured to decode signal data. The decoder device 110 may perform one or more further functions in addition to decoding signal data. The decoder device 110 may be embodied in various different ways. For example, the decoder device 110 may be embodied in hardware and/or software.

Although in this example the second apparatus 104 comprises the decoder device 110, in other examples, the second apparatus 104 is separate from the decoder device 110. In such examples, the second apparatus 104 is communicatively coupled to the decoder device 110. The second apparatus 104 may be embodied as one or more software functions and/or hardware modules.

The encoder device 108 encodes signal data and transmits the encoded signal data to the decoder device 110 via the data communications network 106. The decoder device 110 decodes the received, encoded signal data and generates decoded signal data. The decoder device 110 may output the decoded signal data, or data derived using the decoded signal data. For example, the decoder device 110 may output such data for display on one or more display devices associated with the second apparatus 104.

In some examples described herein, the encoder device 108 transmits to the decoder device 110 a representation of a signal and information the decoder device 110 can use to reconstruct another representation of the signal. Such information may be referred to as "reconstruction data". In some examples, "reconstruction" of a representation involves obtaining a representation that is not an exact replica of an original representation. The extent to which the representation is the same as the original representation may depend on various factors including, but not limited to, quantisation levels. A representation of a signal at a given level of quality may be considered to be a rendition, version or depiction of data comprised in the signal at the given level of quality. In some examples, the reconstruction data is included in the signal data that is encoded by the encoder device 108 and transmitted to the decoder device 110. For example, the reconstruction data may be in the form of metadata. In some examples, the reconstruction data is encoded and transmitted separately from the signal data.

In some examples described herein, the encoder device 108 transmits to the decoder device 110 a representation of a signal at a given level of quality and information the decoder device 110 can use to obtain a representation of the signal at one or more higher levels of quality.

The information the decoder device 110 uses to reconstruct the representation of the signal at the one or more higher levels of quality may comprise intra-processing data. Intra-processing data is an example of reconstruction data. "Intra-processing data" refers to data that is based on a single time sample of a signal. In examples described herein, intra-processing data is or comprises intra-residual data, as described in more detail below.

The information the decoder device 110 uses to reconstruct the representation of the signal at the one or more higher levels of quality may comprise inter-processing data. Inter-processing data is another example of reconstruction data. The inter-processing data is data that exploits temporal correlation between different time samples of a signal. "Inter-processing" is used to refer to processing that involves multiple time samples of a signal. When the signal is a video signal, a given time sample of the signal may be all or part of an image, frame or field from a sequence of images or frames making up the video signal. The inter-processing data may comprise motion compensation data and/or other data. The motion compensation data may compensate for motion of one or more items across different images in a video signal. The motion compensation data may indicate how the one or more items move across the different images in the video signal. The items may be pixels, regions, objects, blocks, features, or any other information in the signal data. The decoder device 110 may store a representation of one time sample of a signal, for example in a memory, and use this representation in conjunction with inter-processing data to obtain a representation of another time sample of the signal. As such, the decoder device 110 can use the inter-processing data to obtain a representation of a given time sample of a signal based on one or more other, for example earlier, time samples of the signal.

Some examples described herein involve dynamically selecting a processing mode from a plurality of different processing modes. The selected processing mode is to be used by the decoder device 110 to obtain a target representation of a given time sample of a signal at a given level of quality. The different processing modes may use, or be associated with, different amounts of data and/or processing to obtain the target representation. Therefore, by selecting a preferred processing mode from the plurality of different processing modes, an overall amount of data and/or processing used to obtain the target representation may be reduced.

Compared to some known techniques, examples described herein allow a relatively small amount of information to be used for obtaining the target representation. This may reduce the amount of data transmitted via the data communications network 106. For example, an entropy associated with coding the reconstruction data may be reduced by selecting reconstruction data having the lowest entropy amongst multiple different types of reconstruction data. An entropy may be considered to represent a minimum achievable code length of the data to be transmitted. "Entropy" as referred to herein may relate to Shannon entropy. The savings may be particularly relevant where the signal data corresponds to high quality video data, where the amount of information transmitted in known systems can be especially high.

Some examples described herein involve dynamically choosing a processing mode with which to process a representation of a given time sample of a signal to obtain the target representation. The chosen processing mode may be more efficient to use than one or more other processing modes that are not chosen. Compared to some known techniques, processing and/or encoding of signals may therefore be performed in a more efficient manner. This may reduce the amount of processing and/or data needed to process and/or encode a signal.

Compared to some known techniques, processing and/or encoding of signals may be performed in a more dynamic and well-defined manner. An extent of temporal correlation between representations of different time samples of a signal may be exploited, as well as an amount of detail and/or complexity within a representation of a single time sample of the signal, in order to determine a level-of-quality-dependent best processing mode for a given signal.

Figure 2:
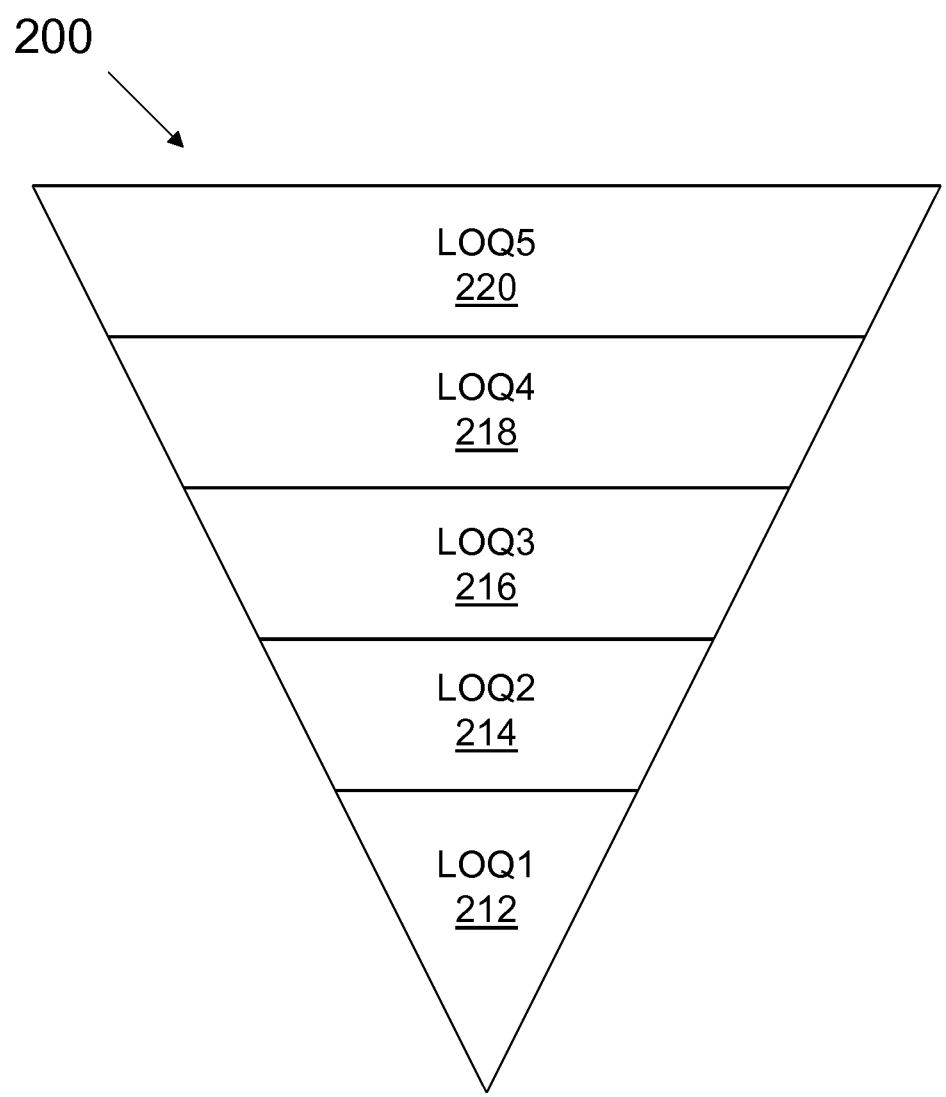
FIG. 2 shows a schematic diagram of an example of a hierarchical signal processing arrangement in accordance with an embodiment of the present invention.

Referring to FIG. 2, there is shown schematically an example of a hierarchical signal processing arrangement 200. An apparatus, for example comprising the encoder device 108 or the decoder device 110, may process and/or obtain representations of one or more signals that are arranged in accordance with a hierarchical signal processing arrangement such as the hierarchical signal processing arrangement 200. As such, the hierarchical signal processing arrangement 200 may be used to process and/or obtain signals.

The hierarchical signal processing arrangement 200 represents a tiered hierarchy having multiple different levels of quality. A given level of quality in the tiered hierarchy is hereinafter referred to as an "LOQ". The levels of quality may relate to different levels of quality of data associated with the signal. The levels of quality may be quantifiable measures of quality of data associated with the signal. In some examples, the hierarchical signal processing arrangement 200 represents multiple different levels of quality of video data. A factor that can be used to determine quality of image and/or video data is resolution. A higher resolution may correspond to a higher level of quality. The resolution may be spatial and/or temporal. Other factors that can be used to determine quality of image and/or video data include, but are not limited to, a level of quantization of the data, a level of frequency filtering of the data, peak signal-to-noise ratio of the data, a structural similarity (SSIM) index, etc. The hierarchical signal processing arrangement 200 may represent different levels of quality of data associated with a given time sample of the signal. For example, where the signal is a video signal, the hierarchical signal processing arrangement 200 may be used to obtain and/or process a given image or frame of the video signal.

In this example, the hierarchical signal processing arrangement 200 has five different layers (or 'levels'), namely a first layer 212, a second layer 214, a third layer 216, a fourth layer 218 and a fifth layer 220. The hierarchical signal processing arrangement could however have a different number of layers. The first layer 212 may be considered to be a base layer in that it represents a base level of quality and the second, third, fourth and fifth layers 214, 216, 218, 220 may be considered to be enhancement layers in that they represent enhancements in terms of quality over that associated with the base layer. As such, the level of quality increases from the bottom to the top of the hierarchical signal processing arrangement 200.

The reader is referred to UK patent application no. GB1603727.7, which describes a hierarchical arrangement in more detail. The entire contents of GB1603727.7 are incorporated herein by reference.

Signal data may be processed at one, some of, or all of the distinct LOQs. Each of the layers 212, 214, 216, 218, 220 may be associated with respective reconstruction data, for example intra-processing data and/or inter-processing data. Intra-processing data and/or inter-processing data may be used to generate data, such as image and/or video data, at a given LOQ, as will be described in more detail below.

In some examples, processing of signal data at a given LOQ results in a change in the LOQ of the signal data. For example, processing of signal data may result in an increase of the LOQ of the signal data relative to an original LOQ. An increase of the LOQ may involve, for example, an upsampling operation being performed on the signal data.

Processing of signal data may additionally or alternatively result in a decrease of the LOQ of the signal data relative to an original LOQ. A decrease of the LOQ may involve, for example, a downsampling operation being performed on the signal data. Thus, processing of signal data may be associated with an ascent and/or a descent of the tiered hierarchy.

In some examples, the processing of signal data at a given LOQ does not result in a change in the LOQ of the signal data. Signal data at a given LOQ may be obtained and/or processed using a plurality of different processing modes, for example two different processing modes, as will be described in more detail below.

Figure 3:
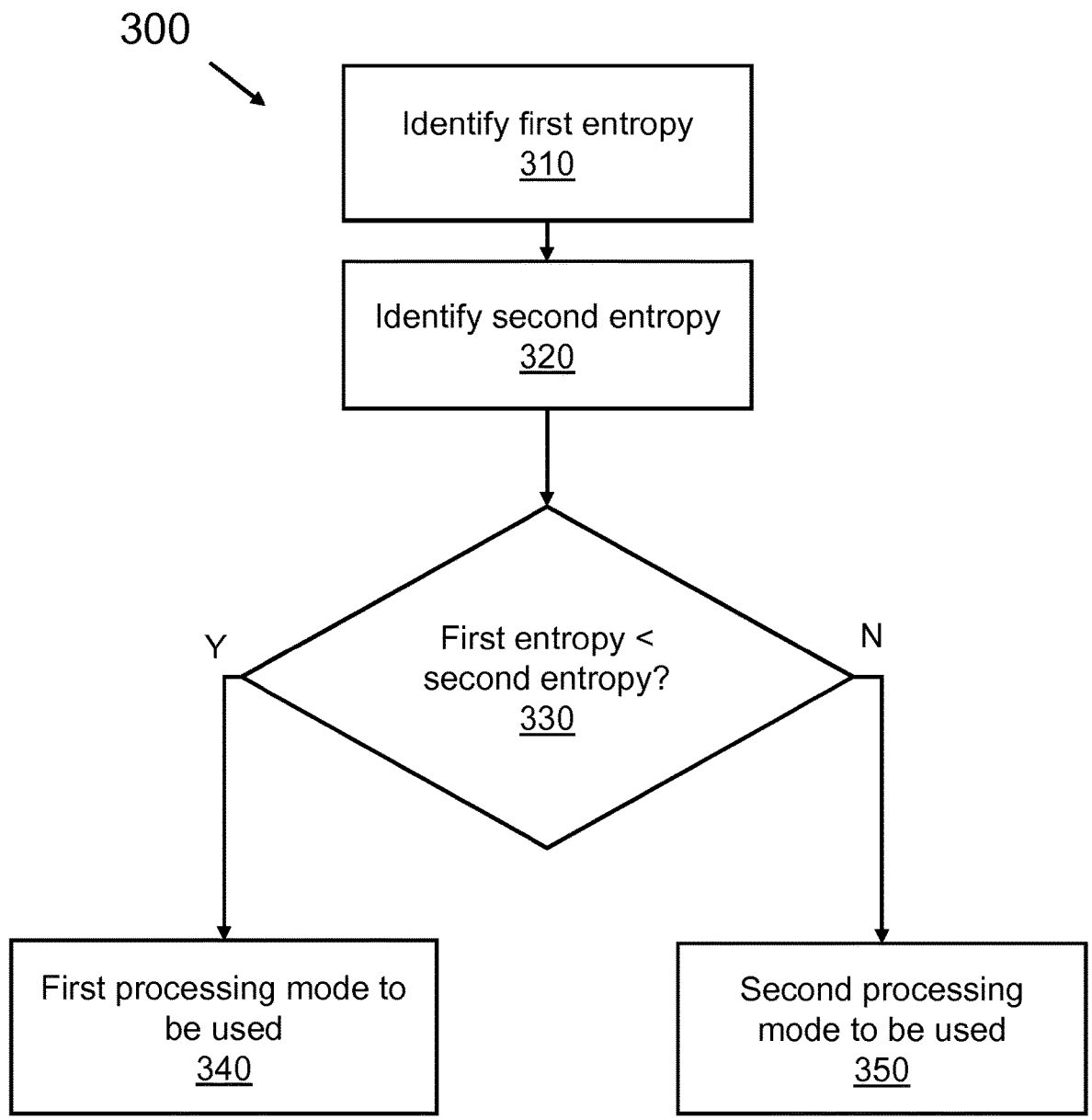
FIG. 3 shows a flow diagram depicting an example of a method in accordance with an embodiment of the present invention.

Referring to FIG. 3, there is shown an example of a method 300 for use in the obtaining of a target representation of a first time sample, $t_1$, of a signal. The method 300 may be performed by an apparatus comprising an encoder device such as the first apparatus 102 described above.

The signal is arranged in accordance with a tiered hierarchy having multiple LOQs, such as described above. The target representation is at a first LOQ.

In some examples, the apparatus obtains a further representation of the first time sample, $t_1$, of the signal. The further representation is at a second LOQ, the second LOQ being lower than the first LOQ. In some examples, the apparatus obtains a representation of a second, different time sample, $t_2$, of the signal. The representation of the second time sample of the signal is at a third LOQ. The third LOQ may be the same as or different from the first and/or second LOQs.

At item 310, a first entropy is identified. The first entropy is associated with first reconstruction data (for example intra-residual data) useable by a decoder device to obtain the target representation using a first processing mode. The first entropy may correspond to an efficiency characteristic. In some examples, the first entropy is indicative of a coding efficiency associated with the first reconstruction data.

In some examples, identifying the first entropy comprises determining the first entropy. Determining the first entropy may comprise deriving the first reconstruction data.

Determining the first entropy comprises processing the further representation of the first time sample, $t_1$, of the signal. In some examples, determining the first entropy comprises performing an upsampling operation on the further representation to obtain a preliminary representation of the first time sample, $t_1$, of the signal at the first LOQ. In some examples, using the first processing mode comprises performing an operation other than an upsampling operation. The upsampling operation may result in a representation that is at a higher LOQ than the LOQ of the further representation. As such, determining the first entropy may involve ascending at least part of the tiered hierarchy.

The first reconstruction data may be derived using the preliminary representation. In some examples the first reconstruction data is derived by comparing the preliminary representation with the target representation. The first reconstruction data may comprise intra-residual data useable by the decoder device to obtain the target representation using the further representation. The intra-residual data may be combinable with the preliminary representation at the first level of quality, which is derived based on the further representation, to obtain the target representation.

The first entropy may be derived using the first reconstruction data. For example, the first entropy may be indicative of a coding efficiency of encoded first reconstruction data.

At item 320, a second entropy is identified. The second entropy is associated with second reconstruction data (for example inter-processing data) useable by a decoder device to obtain the target representation using a second processing mode. The second entropy may correspond to an efficiency characteristic. In some examples, the second entropy is indicative of a coding efficiency associated with the second reconstruction data.

In some examples, identifying the second entropy comprises determining the second entropy.

Determining the second entropy comprises processing the representation of the second time sample, $t_2$, of the signal. The first time sample, $t_1$, may be a later time sample in the signal relative to the second time sample, $t_2$.

In some examples, determining the second entropy comprises deriving the second reconstruction data. The second reconstruction data may comprise inter-processing data relating to the first time sample, $t_1$, and the second time sample, $t_2$. The inter-processing data is useable by a decoder device to obtain the target representation using the representation of the second time sample, $t_2$. The inter-processing data comprises motion compensation data. The motion compensation data relates to motion of one or more items between the second time sample, $t_2$, and the first time sample, $t_1$. The items may relate to signal data. For example, where the signal is a video signal and the representation of the second time sample, $t_2$, is correspondingly a frame of the video signal, the items may be pixels, regions, objects, blocks, features, or any other information contained in the representation of the second time sample, $t_2$. As such, the motion compensation data may relate to how such items move between the representation of the second time sample, $t_2$, and the target representation of the first time sample, $t_1$. The motion compensation data may exploit temporal correlation between the second time sample, $t_2$, and the first time sample, $t_1$.

The motion compensation data may comprise one or more motion vectors. The one or more motion vectors relate to motion of the one or more items between the representation of the second time sample, $t_2$, and the target representation. A motion vector may be used to represent an item at the first time sample, $t_1$, based on a position of a similar item at the second time sample, $t_2$.

The motion compensation data may be useable to obtain a predicted representation of the first time sample, $t_1$, of the signal at the first LOQ. The predicted representation may be derived based on motion compensation data. The predicted representation is a prediction of the target representation. In some examples, the inter-processing data comprises or is otherwise associated with inter-residual data. The inter-residual data is derived based on a comparison between the predicted representation and the target representation. The inter-residual data may be based on a difference between the predicted representation and the target representation. The inter-residual data may be used to adjust the predicted representation in order to obtain the target representation. "Inter-residual data" contrasts with "intra-residual data" in that inter-residual data relates to inter-frame processing, whereas intra-residual data relates to intra-frame processing. Both inter-residual data and intra-residual data may specify a difference between a predicted representation of the first time sample, $t_1$, of the signal and the target representation of the first time sample, $t_1$, of the signal. As such, the second reconstruction data, namely the inter-processing data, may comprise motion compensation data and inter-residual data. The combination of motion compensation data and inter-residual data may be used to reconstruct the target representation.

The second entropy may be derived using the second reconstruction data. For example, the second entropy may be indicative of a coding efficiency of encoded second reconstruction data. As such, the second entropy may be indicative of a coding efficiency of a combination of motion compensation data and inter-residual data.

Different first and/or second entropies may be identified for different time samples of the signal. In some examples, different first and/or second entropies are identified for representations at different LOQs. In some examples, different first and/or second entropies are identified for different regions or tiles in a given target representation. The first and/or second entropies may therefore be dynamically determined and used.

In some examples, the encoder device receives data arranged to indicate the first and/or second entropy from at least one further entity. In such examples, the encoder device does not determine the first and/or second entropy itself, but is informed of the first and/or second entropy by the at least one further entity.

At item 330, it is determined whether the first entropy is lower than the second entropy. Comparing the first entropy with the second entropy facilitates a determination of a processing mode to be used to obtain the target representation. The processing mode may be either the first processing mode or the second processing mode.

Whether the first entropy (for example associated with intra-processing data comprising intra-residual data) is below the second entropy (for example associated with inter-processing data comprising a combination of motion compensation data and inter-residual data) may be influenced by an extent of motion of items between the first time sample, $t_1$, and the second time sample, $t_2$. A relatively large extent of motion of items between the first time sample, $t_1$, and the second time sample, $t_2$, may correspond to relatively large inter-processing data. The size of the inter-processing data may affect the second entropy relative to the first entropy.

In this example, if it is determined at item 330 that the first entropy is lower than the second entropy, it is determined at item 340 that the first processing mode is to be used by a decoder device to obtain the target representation.

In some examples, responsive to determining that the first processing is to be used by the decoder device to obtain the target representation, data based on the first reconstruction data, for example encoded intra-residual data, is output. The data based on the first reconstruction data is useable by the decoder device to derive the first reconstruction data. The data based on the first reconstruction data may be transmitted to the decoder device. In some examples, the decoder device may determine that the first processing mode is to be used to obtain the target representation based on receiving the data based on the first reconstruction data.

If it is determined at item 330 that the second entropy is lower than the first entropy, it is determined at item 350 that the second processing mode is to be used by a decoder device to obtain the target representation.

In some examples, responsive to determining that the second processing is to be used by the decoder device to obtain the target representation, data based on the second reconstruction data, for example encoded motion compensation data and inter-residual data, is output. The data based on the second reconstruction data is useable by the decoder device to derive the second reconstruction data. The data based on the second reconstruction data may be transmitted to the decoder device. In some examples, the decoder device may determine that the second processing mode is to be used to obtain the target representation based on receiving the data based on the second reconstruction data.

As such, instead of generating, using and/or outputting intra-processing data dependent on a single time sample such as that obtained in the first processing mode, in the second processing mode an apparatus generates, uses and/or outputs inter-processing data. Both intra-processing data and inter-processing data are examples of reconstruction data and may be useable to obtain the target representation. However, generating, using and/or outputting intra-processing data may involve a different amount of processing and/or a different amount of data being transmitted compared to generating, using and/or outputting inter-processing data.

In some examples, whether intra-processing data or inter-processing data is more efficient to generate, use and/or output depends on the LOQ of the signal that is being processed. For example, at lower LOQs, generating, using and/or outputting inter-processing data may be more efficient than generating, using and/or outputting intra-processing data. The inter-processing data (for example comprising a combination of motion compensation data and inter-residual data) may have a lower entropy than the intra-processing data (for example comprising intra-residual data) at lower LOQs. In contrast, at higher LOQs, generating, using and/or outputting inter-processing data may be less efficient than generating, using and/or outputting intra-processing data. The intra-processing data may have a lower entropy than the inter-processing data at higher LOQs, for example. Consequently, one or more threshold LOQs may be identified, below which the inter-processing data has a lower entropy than the intra-processing data and above which the intra-processing data has a lower entropy than the inter-processing data. Therefore, a first processing mode in which intra-processing data is used may be used when processing a signal at an LOQ that is above the one or more threshold LOQs, and a second processing mode in which inter-processing data is used may be used when processing a signal at an LOQ that is below the one or more threshold LOQs.

If it is determined that the first entropy is equal to the second entropy, the first, second or another processing mode may be used.

Data arranged to indicate whether the first or second processing mode is to be used is output, for example for transmission to at least one further entity. For example, such data may be output by an encoder device for transmission to and receipt by a decoder device, to enable the decoder device to obtain the target representation using the determined processing mode. In some examples, the encoder device obtains the target representation.

In some examples, data arranged to indicate one or more threshold LOQs is output, for example for transmission to at least one further entity. For example, such data may be output by an encoder device for transmission to and receipt by a decoder device. The one or more threshold LOQs may be considered to be an artifact of a determination by the encoder device of whether to the target representation is to be obtained using the first processing mode or the second processing mode. The one or more threshold LOQs may be useable by the decoder device to determine whether to obtain the target representation using the first processing mode or the second processing mode.

In some examples, the encoder device determines that the target representation is to be obtained by the decoder device using one of the first and the second processing mode, for example the second processing mode, and determines that a first further target representation of the first time sample of the signal is to be obtained by the decoder device using the other of the first and the second processing mode, for example the first processing mode. The first further target representation is at an LOQ that is higher than the LOQ of the target representation, namely the first LOQ.

In some examples, the encoder device determines that a second further target representation of the first time sample of the signal is to be obtained by the decoder device using the one of the first and the second processing mode, for example the second processing mode. The second further target representation is at an LOQ that is higher than the LOQ of the first further target representation. As such, it may be determined that the second processing mode is to be used to obtain the target representation (being at a first LOQ), that the first processing mode is to be used to obtain the first further target representation (being at a second, higher LOQ), and that the second processing mode is to be used to obtain the second further target representation (being at a third, even higher LOQ). Therefore, the processing mode to be used to obtain a given representation may change as the tiered hierarchy is ascended.

Figure 4:
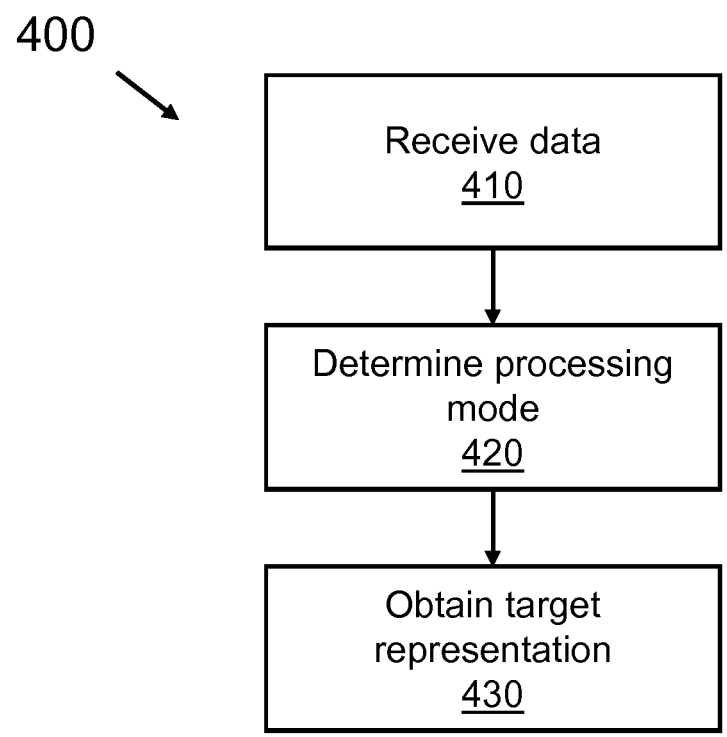
FIG. 4 shows a flow diagram depicting another example of a method in accordance with an embodiment of the present invention.

Referring to FIG. 4, there is shown an example of a method 400 of obtaining a target representation of a first time sample, $t_1$, of a signal. The method 400 may be performed by an apparatus comprising a decoder device such as the second apparatus 104 described above.

The signal is arranged in accordance with a tiered hierarchy having multiple LOQs, such as described above. The target representation is at a first LOQ.

In some examples, the apparatus obtains a further representation of the first time sample, $t_1$, of the signal. The further representation is at a second LOQ, the second LOQ being lower than the first LOQ. In some examples, the apparatus obtains a representation of a second, different time sample, $t_2$, of the signal. The representation of the second time sample of the signal is at a third LOQ. The third LOQ may be the same as or different from the first and/or second LOQs.

At item 410, data is received from one or more further entities, for example an apparatus comprising an encoder device such as the first apparatus 102 described above. The received data may be arranged to indicate a processing mode to be used by the decoder device to obtain the target representation. In some examples, the received data is arranged to indicate a type of reconstruction data, such as intra-processing data or inter-processing data, to be used to obtain the target representation. For example, if data useable to derive intra-processing data is received for a given LOQ, the decoder device may use the first processing mode to obtain the target representation at the given LOQ on the basis of such received data. Contrastingly, if data useable to derive inter-processing data is received for a given LOQ, the decoder device may use the second processing mode to obtain the target representation at the given LOQ on the basis of such received data.

At item 420, it is determined whether the target representation is to be obtained using the first processing mode or the second processing mode. The first processing mode is to be used by the decoder device when a first entropy associated with first reconstruction data is lower than a second entropy associated with second reconstruction data. The second processing mode is to be used by the decoder device when the second entropy is lower than the first entropy.

Using the first processing mode to obtain the target representation comprises the decoder device processing the first reconstruction data and the further representation of the first time sample of the signal. The first reconstruction data may comprise intra-processing data comprising intra-residual data useable to reconstruct the target representation using the further representation. Using the first processing mode may comprise performing an upsampling operation on the further representation to derive a preliminary representation of the first time sample, $t_1$, of the signal at the first LOQ. The first reconstruction data and the preliminary representation may be used to obtain the target representation, for example by combining the preliminary representation with the first reconstruction data. Data useable to derive the first reconstruction data may be comprised in the received data.

Using the second processing mode to obtain the target representation comprises the decoder device processing the second reconstruction data and the representation of the second time sample, $t_2$, of the signal. The second reconstruction data may comprise inter-processing data. The inter-processing data relates to the first time sample, $t_1$, and the second time sample, $t_2$. Using the second processing mode may comprise using the inter-processing data to reconstruct the target representation using the representation of the second time sample, $t_2$, of the signal. Data useable to derive the second reconstruction data may be comprised in the received data. The inter-processing data may comprise motion compensation data. In some examples, using the second processing mode comprises the decoder device using the motion compensation data to obtain a predicted representation of the first time sample, $t_1$, of the signal at the first LOQ. In some examples, the inter-processing data also comprises inter-residual data derived based on a comparison between the predicted representation and the target representation.

In some examples, the received data is arranged to indicate one or more threshold LOQs. The one or more threshold LOQs may be used to determine whether the decoder device is to obtain the target representation using the first processing mode or the second processing mode. In some examples, the first processing mode is to be used when a predetermined LOQ associated with the target representation is above the one or more threshold LOQs and the second processing mode is to be used when the predetermined LOQ is below the one or more threshold LOQs. The predetermined LOQ may be, for example, the first LOQ or the second LOQ.

In some examples, the one or more threshold LOQs comprise a plurality of threshold LOQs. Each of the plurality of threshold LOQs may correspond to a respective one of multiple regions of the first time sample, $t_1$, of the signal. Each of the plurality of threshold LOQs may be indicative of a processing mode to be used to obtain a different region of the first time sample, $t_1$, of the signal. For example, each of the plurality of threshold LOQs may result from a determination of which processing mode is to be used to obtain a given region of the first time sample, $t_1$, of the signal. Where the signal comprises a video signal, the different regions of the first time sample, $t_1$, of the signal may correspond to different tiles or portions of a frame of the video signal.

In some examples, the one or more threshold LOQs may be variable for different time samples of the signal. Therefore, a same part of different time samples of a signal may be obtained using different processing modes. For example, a given part of a first time sample of the signal may be obtained using the first processing mode and the given part of a second, different time sample of the signal may be obtained using the second processing mode.

At item 430, the target representation is obtained by the decoder device using either the first processing mode or the second processing mode, based on the determination made at item 420.

In some examples, the decoder device determines that the target representation is to be obtained using one of the first and the second processing mode, for example the second processing mode, and determines that a first further target representation of the first time sample of the signal is to be obtained using the other of the first and the second processing mode, for example the first processing mode. The first further target representation is at an LOQ that is higher than the first LOQ.

In some examples, the decoder device determines that a second further target representation of the first time sample of the signal is to be obtained using the one of the first and the second processing mode, for example the first processing mode. The second further target representation is at a LOQ that is higher than the LOQ of the first further representation.

Figure 5:
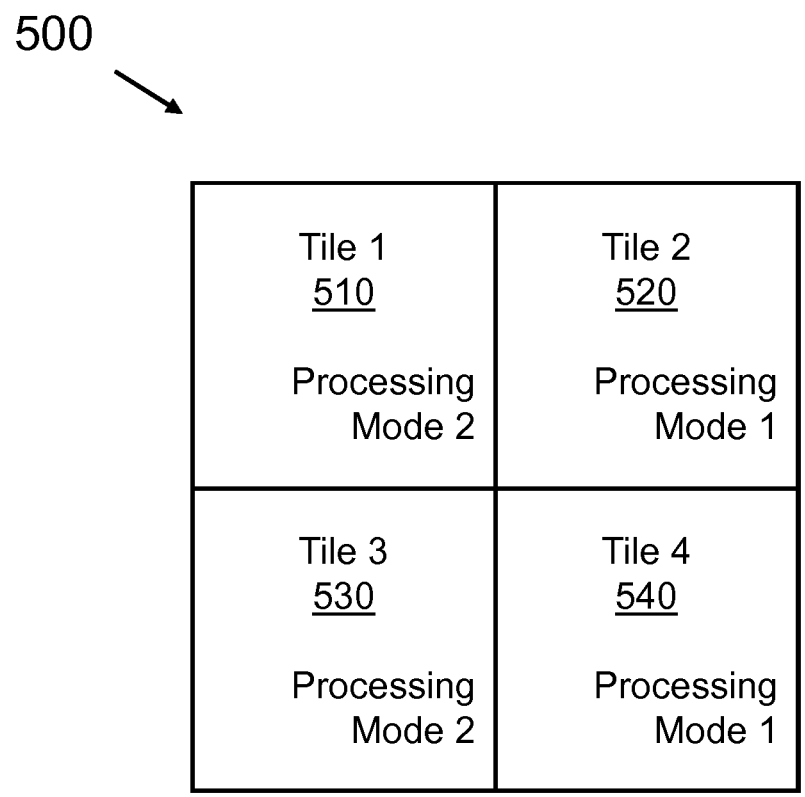
FIG. 5 shows schematically an example of a representation of a time sample of a signal in accordance with an embodiment of the present invention.

Referring to FIG. 5, there is shown an example of a representation of a time sample of a signal 500. In this example, the representation 500 is an image. The image 500 may for example be obtained from video data. The image 500 is an example of a target representation of a first time sample, $t_1$, of a signal, where the signal comprises a video signal. The image may be at a first level of quality in a tiered hierarchy having multiple LOQs.

The image 500 comprises a plurality of tiles. A tile corresponds to a part of an image. In this example, the image 500 comprises four tiles, it being understood that different numbers of tiles may be used in other examples. Different tiles correspond to different parts of an image. As such, different features, objects and/or items may appear in different tiles. Additionally or alternatively, different amounts of motion may be present in different tiles. The motion may include the motion of items between different images in the video. In some examples, one or more tiles may be associated with one or more regions of interest in the image 500. A region of interest in an image may be a region at which a viewer is or is likely to be looking. A viewer may, for example, be focussing their gaze on a given tile in the image.

Different processing modes may be used to obtain the different parts of image 500. The processing mode for a given tile may be determined based on a comparison between a first entropy associated with first reconstruction data useable to obtain the given tile using the first processing mode and a second entropy associated with second reconstruction data useable to obtain the tile using the second processing mode. In this example, tile 520 and tile 540 are to be obtained using the first processing mode and tile 510 and tile 530 are to be obtained using the second processing mode. In this example, the first processing mode, which may be referred to as "intra-processing", involves using a representation of the same time sample of the video signal that is at a different level of quality compared with the target representation. For example, tile 520 may be obtained using a corresponding tile from an image that is at a LOQ than image 500 but that is nevertheless a representation of the same time sample of the video signal. In this example, the second processing mode, which may be referred to as "inter-processing", involves using a representation of a different time sample of the video signal. For example, tile 510 may be obtained using a corresponding tile from an earlier or later image in the video signal.

Figure 6:
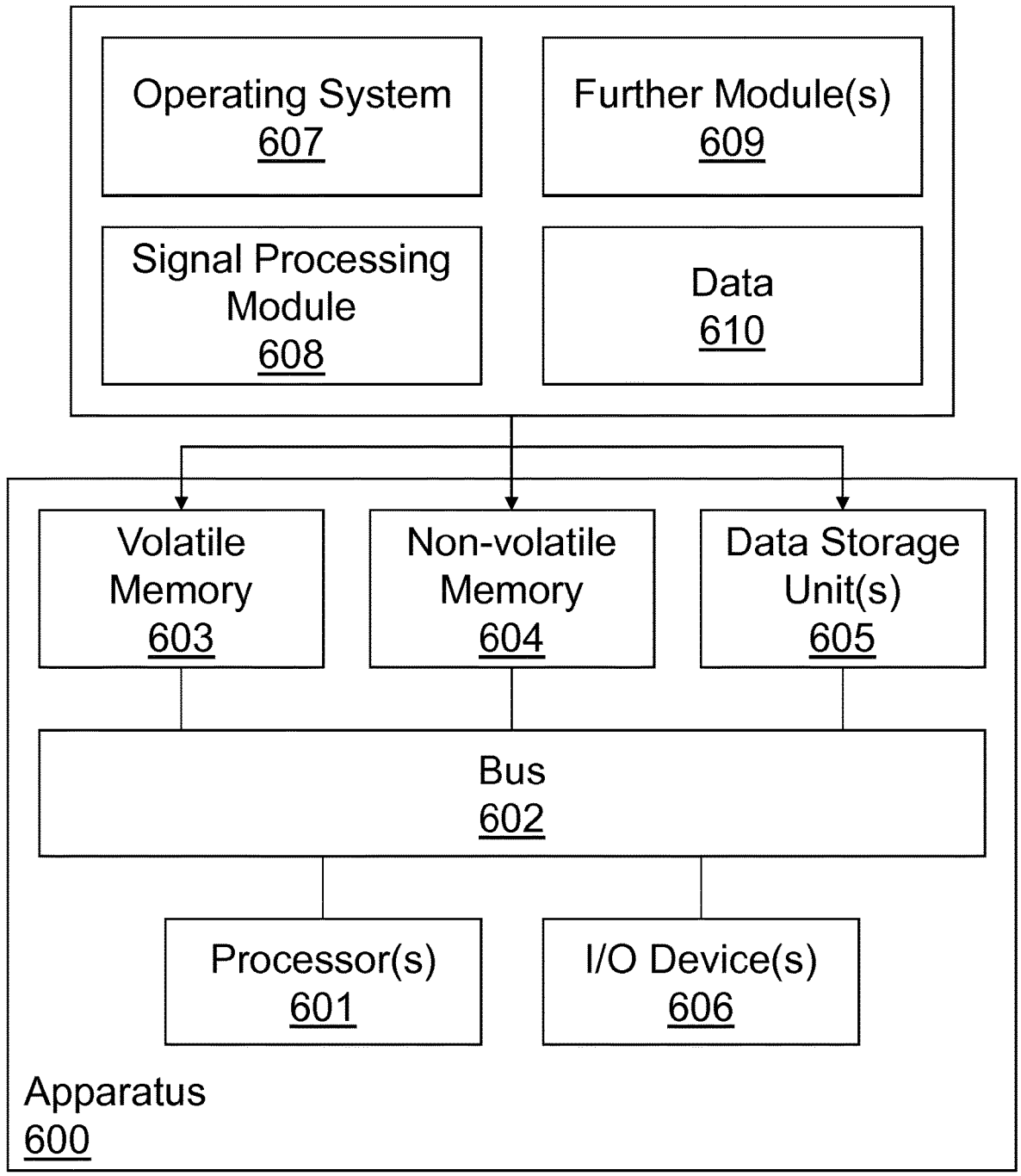
FIG. 6 shows a schematic block diagram of an example of an apparatus in accordance with an embodiment of the present invention.

Referring to FIG. 6, there is shown a schematic block diagram of an example of an apparatus 600.

In an example, the apparatus 600 comprises an encoder device. In another example, the apparatus 600 comprises a decoder device.

Examples of apparatus 600 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, or in general any type of computing or electronic device.

In this example, the apparatus 600 comprises one or more processors 601 configured to process information and/or instructions. The one or more processors 601 may comprise a central processing unit (CPU). The one or more processors 601 are coupled with a bus 602. Operations performed by the one or more processors 601 may be carried out by hardware and/or software. The one or more processors 601 may comprise multiple co-located processors or multiple disparately located processors.

In this example, the apparatus 600 comprises computer-useable volatile memory 603 configured to store information and/or instructions for the one or more processors 601. The computer-useable volatile memory 603 is coupled with the bus 602. The computer-useable volatile memory 603 may comprise random access memory (RAM).

In this example, the apparatus 600 comprises computer-useable non-volatile memory 604 configured to store information and/or instructions for the one or more processors 601. The computer-useable non-volatile memory 604 is coupled with the bus 602. The computer-useable non-volatile memory 604 may comprise read-only memory (ROM).

In this example, the apparatus 600 comprises one or more data-storage units 605 configured to store information and/or instructions. The one or more data-storage units 605 are coupled with the bus 602. The one or more data-storage units 605 may for example comprise a magnetic or optical disk and disk drive or a solid-state drive (SSD).

In this example, the apparatus 600 comprises one or more input/output (I/O) devices 606 configured to communicate information to and/or from the one or more processors 601. The one or more I/O devices 606 are coupled with the bus 602. The one or more I/O devices 606 may comprise at least one network interface. The at least one network interface may enable the apparatus 600 to communicate via one or more data communications networks. Examples of data communications networks include, but are not limited to, the Internet and a Local Area Network (LAN). The one or more I/O devices 606 may enable a user to provide input to the apparatus 600 via one or more input devices (not shown). The one or more input devices may include for example a remote control, one or more physical buttons etc. The one or more I/O devices 606 may enable information to be provided to a user via one or more output devices (not shown). The one or more output devices may for example include a display screen.

Various other entities are depicted for the apparatus 600. For example, when present, an operating system 607, data signal processing module 608, one or more further modules 609, and data 610 are shown as residing in one, or a combination, of the computer-usable volatile memory 603, computer-usable non-volatile memory 604 and the one or more data-storage units 605. The data signal processing module 608 may be implemented by way of computer program code stored in memory locations within the computer-usable non-volatile memory 604, computer-readable storage media within the one or more data-storage units 605 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 600 may therefore comprise a data signal processing module 608 which can be executed by the one or more processors 601. The data signal processing module 608 can be configured to include instructions to implement at least some of the operations described herein. During operation, the one or more processors 601 launch, run, execute, interpret or otherwise perform the instructions in the signal processing module 608.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 600 may comprise more, fewer and/or different components from those depicted in FIG. 6.

The apparatus 600 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

In some examples, it is determined whether a target representation of a first time sample of a signal is to be obtained using a first processing mode or a second, different processing mode. The signal is arranged in a tiered hierarchy having multiple LOQs, the target representation being at a first LOQ. The first processing mode is to be used when a first entropy associated first reconstruction data useable to obtain the target representation using the first processing mode is lower than a second entropy associated with second reconstruction data useable to obtain the target representation using the second processing mode. The second processing mode is to be used when the second entropy is lower than the first entropy. Using the first processing mode to obtain the target representation comprises processing the first reconstruction data and a further representation of the first time sample of the signal that is at a second, different LOQ. Using the second processing mode comprises processing the second reconstruction data and a representation of a second, different time sample of the signal.

In some examples, an encoder device is configured to identify the lower of: a first entropy of intra-processing data useable by a decoder device to obtain a target representation of a signal based on a first representation of the signal; and a second entropy of inter-processing data useable by the decoder device to obtain the target representation of the signal based on a second, different representation of the signal. The first representation and the target representation are part of a sample time sample of the signal. The second representation is part of an earlier time sample of the signal relative to the first representation and the target representation. The encoder device is configured to output, for transmission to the decoder device, data arranged to indicate that the decoder device is to use the intra-processing data to obtain the target representation of the signal in response to the first entropy being identified as the lower of the first and second entropies. The encoder device is configured to output, for transmission to the decoder device, data arranged to indicate that the decoder device is to use the inter-processing data to obtain the target representation of the signal in response to the second entropy being identified as the lower of the first and second entropies.

In some examples, a decoder device is configured to receive data arranged to indicate whether the decoder device is to use intra-processing data or inter-processing data to obtain a target representation of a signal. The decoder device is configured to determine, based on the received data, whether the decoder device is to use the intra-processing data or the inter-processing data to obtain the target representation of the signal. The decoder device is configured to obtain the target representation of the signal based on a first representation of the signal and using the intra-processing data in response to the determining indicating that the decoder device is to use the intra-processing data to obtain the target representation of the signal. The first representation and the target representation are part of a same time sample of the signal. The decoder device is configured to obtain the target representation of the signal based on a second, different representation of the signal and using the inter-processing data in response to the determining indicating that the decoder device is to use the inter-processing data to obtain the target representation of the signal. The second representation is part of an earlier time sample of the signal relative to the target representation and the first representation.

In some examples, a dynamic threshold level of quality in a hierarchical signal processing arrangement is used by a decoder device to determine a processing mode to be used to obtain a target representation of a time sample of a signal. Above the dynamic threshold level of quality, a first processing mode is used. The first processing mode involves processing a further representation of the same time sample of the signal that is at a different level of quality compared to the target representation. Below the dynamic threshold level of quality, a second processing mode is used. The second processing mode involves processing a representation of a different time sample of the signal.

The above embodiments are to be understood as illustrative examples of the invention. Further embodiments of the invention are envisaged.

In examples described above, the first time sample, $t_1$, and the second time sample, $t_2$, are both time samples of the same signal. In other examples, the first time sample, $t_1$, and the second time sample, $t_2$, are time samples of different signals. For example, if the signals are video signals, the second time sample, $t_2$, may correspond to a last frame of a first video and the first time sample, $t_1$, may correspond to a first frame of a subsequent video. As such, in the second processing mode, a target representation of a first time sample $t_1$, of a signal may be obtained based at least in part on a representation of the second time sample, $t_2$, of a signal.

In examples described above, the first time sample, $t_1$, is a later time sample than the second time sample, $t_2$. In other examples, the first time sample, $t_1$, is an earlier time sample than the second time sample, $t_2$.

In examples described above, the first processing mode is to be used when the first entropy is lower than the second entropy and the second processing mode is to be used when the second entropy is lower than the first entropy. In other examples, the first processing mode is to be used when the first entropy is higher than the second entropy and the second processing mode is to be used when the second entropy is higher than the first entropy. As such, one of the first processing mode and the second processing mode is to be used when the first entropy is lower than the second entropy and the other of the first processing mode and the second processing mode is to be used when the second entropy is lower than the first entropy.

In examples described above, an apparatus comprising the decoder device obtains the target representation. In some examples, the apparatus comprising the decoder device also determines the processing mode to be used to obtain the target representation. In other examples, the processing mode to be used to obtain the target representation is determined by at least one further entity and is indicated to the apparatus.

In examples described above, the processing mode to be used to obtain the target representation is determined based on first and second entropies. In other examples, a different type of processing characteristic can be used in addition to or as an alternative to the first and the second entropies. The processing characteristic may relate to a characteristic of the first processing mode and/or the second processing mode. The characteristic may be an efficiency characteristic, for example a coding efficiency and/or a processing efficiency.

Various measures (for example apparatuses, methods and computer programs) are provided. A first entropy associated with first reconstruction data useable by a decoder device to obtain a target representation of a first time sample of a signal using a first processing mode is compared with a second entropy associated with second reconstruction data useable by the decoder to obtain the target representation using a second, different processing mode. The signal is arranged in accordance with a tiered hierarchy having multiple levels of quality. The target representation is at a first level of quality in the tiered hierarchy. Based on a result of the comparison, it is determined whether the target representation is to be obtained by the decoder device using the first processing mode or the second processing mode. The first processing mode is to be used when the result of the comparison indicates that the first entropy is lower than the second entropy. The second processing mode is to be used when the result of the comparison indicates that the second entropy is lower than the first entropy. Data arranged to indicate whether the first processing mode or the second processing mode is to be used by the decoder device to obtain the target representation is output. Using the first processing mode to obtain the target representation comprises the first reconstruction data and a further representation of the first time sample of the signal that is at a second, lower level of quality in the tiered hierarchy being processed by the decoder device. Using the second processing mode to obtain the target representation comprises the second reconstruction data and a representation of a second, different time sample of the signal being processed by the decoder device.

The target representation and the representation of the second time sample may be at a same level of quality as each other in the tiered hierarchy.

In some examples, data arranged to indicate the first entropy is received. In some examples, the first entropy is determined. Determining the first entropy may comprise deriving the first reconstruction data. In some examples, determining the first entropy comprises performing an upsampling operation on the further representation to derive a preliminary representation of the first time sample of the signal at the first level of quality, and deriving the first reconstruction data using the preliminary representation.

The first reconstruction data may comprise intra-residual data useable by the decoder device to obtain the target representation using the further representation.

In some examples, responsive to determining that the first processing mode is to be used, data based on the first reconstruction data is output.

In some examples, data arranged to indicate the second entropy is received. In some examples, the second entropy is determined. Determining the second entropy may comprise deriving the second reconstruction data.

In some examples, the second reconstruction data comprises inter-processing data relating to the first time sample and the second time sample, the inter-processing data being useable by the decoder device to obtain the target representation using the representation of the second time sample. The inter-processing data may comprise motion compensation data relating to motion of one or more items between the representation of the second time sample and the target representation. The inter-processing data may comprise inter-residual data derived based on a comparison between a predicted representation of the first time sample of the signal at the first level of quality and the target representation.

In some examples, responsive to determining that the second processing mode is to be used, data based on the second reconstruction data is output.

The second time sample may be an earlier time sample in the signal relative to the first time sample.

In some examples, it is determined that the target representation is to be obtained by the decoder device using one of the first and the second processing mode, and it is determined that a first further target representation of the first time sample of the signal is to be obtained by the decoder device using the other of the first and the second processing mode. The first further target representation is at a level of quality in the tiered hierarchy that is higher than the first level of quality.

In some examples, it is determined that a second further target representation of the first time sample of the signal is to be obtained by the decoder device using the one of the first and the second processing mode. The second further target representation is at a level of quality in the tiered hierarchy that is higher than the level of quality of the first further target representation.

In some examples, outputting the data arranged to indicate whether the first processing mode or the second processing mode is to be used comprises outputting the data for transmission to the decoder device.

In some examples, the first entropy is indicative of a coding efficiency associated with the first reconstruction data, and the second entropy is indicative of a coding efficiency associated with the second reconstruction data.

In some examples, the signal comprises a video signal.

Various measures (for example apparatuses, methods and computer programs) are provided in which an encoder device identifies the lower of a first entropy and a second entropy. The first entropy is of intra-processing data useable by a decoder device to obtain a target representation of a signal based on a first representation of the signal, the first representation and the target representation being part of a same time sample of the signal. The second entropy is of inter-processing data useable by the decoder device to obtain the target representation of the signal based on a second, different representation of the signal, the second representation being part of an earlier time sample of the signal. In response to the first entropy being identified as the lower of the first and second entropies, the encoder device outputs, for transmission to the decoder device, data arranged to indicate that the decoder device is to use the intra-processing data to obtain the target representation of the signal. In response to the second entropy being identified as the lower of the first and second entropies, the encoder device outputs, for transmission to the decoder device, data arranged to indicate that the decoder device is to use the inter-processing data to obtain the target representation of the signal.

Various measures (for example apparatuses, methods and computer programs) are provided in which a decoder device receives data arranged to indicate whether the decoder device is to use intra-processing data or inter-processing data to obtain a target representation of a signal. The decoder device determines, based on the received data, whether the decoder device is to use the intra-processing data or the inter-processing data to obtain the target representation of the signal. In response to the determining indicating that the decoder device is to use the intra-processing data to obtain the target representation of the signal, the decoder device obtains the target representation based on a first representation of the signal and using the intra-processing data. The first representation and the target representation are part of a same time sample of the signal. In response to the determining indicating that the decoder device is to use the inter-processing data to obtain the target representation of the signal, the decoder device obtains the target representation based on a second, different representation of the signal and using the inter-processing data. The second representation is part of an earlier time sample of the signal.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for obtaining a target representation of a first time sample of a signal, the signal being arranged in accordance with a tiered hierarchy having multiple levels of quality, the method comprising:
  comparing a first entropy associated with first reconstruction data useable by a decoder device to obtain the target representation using a first processing mode with a second entropy associated with second reconstruction data useable by the decoder device to obtain the target representation using a second, different processing mode, the target representation being at a first level of quality in the tiered hierarchy;

determining whether the target representation is to be obtained by the decoder device using the first processing mode or the second processing mode based on a result of the comparison, wherein the first processing mode is to be used when the result of the comparison indicates that the first entropy is lower than the second entropy and the second processing mode is to be used when the result of the comparison indicates that the second entropy is lower than the first entropy; and outputting data arranged to indicate whether the first processing mode or the second processing mode is to be used by the decoder device to obtain the target representation, wherein using the first processing mode to obtain the target representation comprises the first reconstruction data and a further representation of the first time sample of the signal that is at a second, lower level of quality in the tiered hierarchy being processed by the decoder device, and wherein using the second processing mode to obtain the target representation comprises the second reconstruction data and a representation of a second, different time sample of the signal being processed by the decoder device.

2. A method according to claim 1, wherein the target representation and the representation of the second time sample are at a same level of quality as each other in the tiered hierarchy.

3. A method according to claim 1, the method comprising receiving data arranged to indicate one or more of the first entropy and the second entropy.

4. A method according to claim 1, the method comprising:
determining the first entropy by deriving the first reconstruction data, including: performing an upsampling operation on the further representation to derive a preliminary representation of the first time sample of the signal at the first level of quality; and
deriving the first reconstruction data using the preliminary representation.

5. A method according to claim 1, wherein one or more of the first reconstruction data and the second reconstruction data comprises intra-residual data useable by the decoder device to obtain the target representation.

6. A method according to claim 5, wherein the inter-processing data for the second reconstruction data comprises motion compensation data relating to motion of one or more items between the representation of the second time sample and the target representation.

7. A method according to claim 6, wherein the inter-processing data for the second reconstruction data comprises inter-residual data derived based on a comparison between a predicted representation of the first time sample of the signal at the first level of quality and the target representation.

8. A method according to claim 1, the method comprising:
determining the second entropy by deriving the second reconstruction data.

9. A method according to claim 1, the method comprising:
determining that the target representation is to be obtained by the decoder device using one of the first and the second processing mode;
determining that a first further target representation of the first time sample of the signal is to be obtained by the decoder device using the other of the first and the second processing mode, the first further target representation being at a level of quality in the tiered hierarchy that is higher than the first level of quality; and
determining that a second further target representation of the first time sample of the signal is to be obtained by the decoder device using the one of the first and the second processing mode, the second further target representation being at a level of quality in the tiered hierarchy that is higher than the level of quality of the first further target representation.

10. A method according to claim 1,
wherein the first entropy is indicative of a coding efficiency associated with the first reconstruction data; and
wherein the second entropy is indicative of a coding efficiency associated with the second reconstruction data.

11. A method of obtaining a target representation of a first time sample of a signal, the signal being arranged in accordance with a tiered hierarchy having multiple levels of quality, the method comprising:
determining, based on received data, whether the target representation is to be obtained using a first processing mode or a second, different processing mode, the target representation being at a first level of quality in the tiered hierarchy; and
obtaining, by a decoder device, the target representation using either the first processing mode or the second processing mode based on a result of the determination,
wherein using the first processing mode to obtain the target representation comprises the decoder device processing first reconstruction data and a further representation of the first time sample of the signal that is at a second, lower level of quality in the tiered hierarchy,
wherein using the second processing mode to obtain the target representation comprises the decoder device processing second reconstruction data and a representation of a second, different time sample of the signal, and
wherein the first processing mode is to be used by the decoder device when a first entropy associated with the first reconstruction data is lower than a second entropy associated with the second reconstruction data, and the second processing mode is to be used by the decoder device when the second entropy is lower than the first entropy.

12. A method according to claim 11, wherein the target representation and the representation of the second time sample are at a same level of quality as each other in the tiered hierarchy.

13. A method according to claim 11, wherein one or more of the first reconstruction data and the second reconstruction data comprises intra-residual data useable to reconstruct the target representation.

14. A method according to claim 11, wherein the using of the first processing mode by the decoder device comprises:
performing, by the decoder device, an upsampling operation on the further representation to derive a preliminary representation of the first time sample of the signal at the first level of quality; and
using, by the decoder device, the first reconstruction data and the preliminary representation to obtain the target representation.

15. A method according to claim 11, wherein the second data comprises inter-processing data useable by the decoder device to reconstruct the target representation using the representation of the second time sample, and wherein the inter-processing data relates to the first time sample and the second time sample.

16. A method according to claim 15, wherein the inter-processing data comprises motion compensation data relating to motion of one or more items between the representation of the second time sample and the target representation.

17. A method according to claim 11, wherein the using of the second processing mode by the decoder device comprises the decoder device using the second reconstruction data to obtain a predicted representation of the first time sample of the signal at the first level of quality, wherein the second reconstruction data comprises inter-residual data derived based on a comparison between the predicted representation and the target representation.

18. A method according to claim 11, the method comprising:
  determining that the target representation is to be obtained using one of the first and the second processing mode;
  determining that a first further target representation of the first time sample of the signal is to be obtained using the other of the first and the second processing mode, the first further target representation being at a level of quality in the tiered hierarchy that is higher than the first level of quality; and
  determining that a second further target representation of the first time sample of the signal is to be obtained using the one of the first and the second processing mode, the second further target representation being at a level of quality in the tiered hierarchy that is higher than the level of quality of the first further target representation.

19. A non-transitory computer-readable medium having stored thereon computer executable instructions that, when executed by a processor, cause a computing system to perform a method for obtaining a target representation of a first time sample of a signal, the signal being arranged in accordance with a tiered hierarchy having multiple levels of quality, the method comprising:
  comparing a first entropy associated with first reconstruction data useable by a decoder device to obtain the target representation using a first processing mode with a second entropy associated with second reconstruction data useable by the decoder device to obtain the target representation using a second, different processing mode, the target representation being at a first level of quality in the tiered hierarchy;
  determining whether the target representation is to be obtained by the decoder device using the first processing mode or the second processing mode based on a result of the comparison, wherein the first processing mode is to be used when the result of the comparison indicates that the first entropy is lower than the second entropy and the second processing mode is to be used when the result of the comparison indicates that the second entropy is lower than the first entropy; and
  outputting data arranged to indicate whether the first processing mode or the second processing mode is to be used by the decoder device to obtain the target representation,
  wherein using the first processing mode to obtain the target representation comprises the first reconstruction data and a further representation of the first time sample of the signal that is at a second, lower level of quality in the tiered hierarchy being processed by the decoder device, and
  wherein using the second processing mode to obtain the target representation comprises the second reconstruction data and a representation of a second, different time sample of the signal being processed by the decoder device.

20. A non-transitory computer-readable medium having stored thereon computer executable instructions that, when executed by a processor, cause a computing system to perform a method of obtaining a target representation of a first time sample of a signal, the signal being arranged in accordance with a tiered hierarchy having multiple levels of quality, the method comprising:
  determining, based on received data, whether the target representation is to be obtained using a first processing mode or a second, different processing mode, the target representation being at a first level of quality in the tiered hierarchy; and
  obtaining, by a decoder device, the target representation using either the first processing mode or the second processing mode based on a result of the determination,
  wherein using the first processing mode to obtain the target representation comprises the decoder device processing first reconstruction data and a further representation of the first time sample of the signal that is at a second, lower level of quality in the tiered hierarchy,
  wherein using the second processing mode to obtain the target representation comprises the decoder device processing second reconstruction data and a representation of a second, different time sample of the signal, and
  wherein the first processing mode is to be used by the decoder device when a first entropy associated with the first reconstruction data is lower than a second entropy associated with the second reconstruction data, and the second processing mode is to be used by the decoder device when the second entropy is lower than the first entropy.

* * * * *